United States Patent
Sandberg et al.

(10) Patent No.: US 12,408,129 B2
(45) Date of Patent: Sep. 2, 2025

(54) AVOIDING CONTENTION BETWEEN SYNCHRONIZATION PACKETS AND IN-PHASE AND QUADRATURE (IQ) PACKETS COMMUNICATED OVER FRONTHAUL OF A RADIO ACCESS NETWORK

(71) Applicant: Outdoor Wireless Networks LLC, Richardson, TX (US)

(72) Inventors: Stuart D. Sandberg, Acton, MA (US); Irfaan Ahamed Salahuddeen, Acton, MA (US)

(73) Assignee: Outdoor Wireless Networks LLC, Richardson, TX (US)

(*) Notice: Subject to any disclaimer, the term of this patent is extended or adjusted under 35 U.S.C. 154(b) by 320 days.

(21) Appl. No.: 17/104,985

(22) Filed: Nov. 25, 2020

(65) Prior Publication Data
US 2021/0160802 A1    May 27, 2021

Related U.S. Application Data

(60) Provisional application No. 62/940,767, filed on Nov. 26, 2019.

(51) Int. Cl.
*H04W 56/00* (2009.01)
*H04L 27/38* (2006.01)
*H04W 72/0446* (2023.01)
*H04W 74/0833* (2024.01)
*H04W 88/08* (2009.01)

(52) U.S. Cl.
CPC ..... *H04W 56/0015* (2013.01); *H04L 27/3863* (2013.01); *H04W 56/0045* (2013.01); *H04W 56/005* (2013.01); *H04W 72/0446* (2013.01); *H04W 74/0833* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 9,936,470 B2 | 4/2018 | Eyuboglu et al. | |
| 2014/0219162 A1* | 8/2014 | Eyuboglu | H04W 16/26 370/315 |
| 2017/0064661 A1* | 3/2017 | Katagiri | H04J 3/0667 |
| 2018/0192412 A1 | 7/2018 | Novlan et al. | |
| 2018/0352561 A1 | 12/2018 | Barabell et al. | |
| 2019/0116568 A1 | 4/2019 | Fertonani et al. | |

(Continued)

OTHER PUBLICATIONS

Assimakopoulos et al., "A Converged Evolved Ethernet Fronthaul for the 5G Era", IEEE Journal on Selected Areas in Communications, Nov. 2018, pp. 2528 through 2537, vol. 36, No. 11, IEEE.

(Continued)

*Primary Examiner* — Gregory B Sefcheck
(74) *Attorney, Agent, or Firm* — Fogg & Powers LLC

(57) ABSTRACT

Techniques are described for avoiding contention between synchronization packets (for example, Institute of Electrical and Electronics Engineers (IEEE) 1588 Precision Time Protocol (PTP) synchronization packets) and in-phase and quadrature (IQ) packets communicated over a fronthaul network used in a radio access network (for example, a Fifth Generation (5G) radio access network).

17 Claims, 3 Drawing Sheets

(56) References Cited

U.S. PATENT DOCUMENTS

Figure 1:
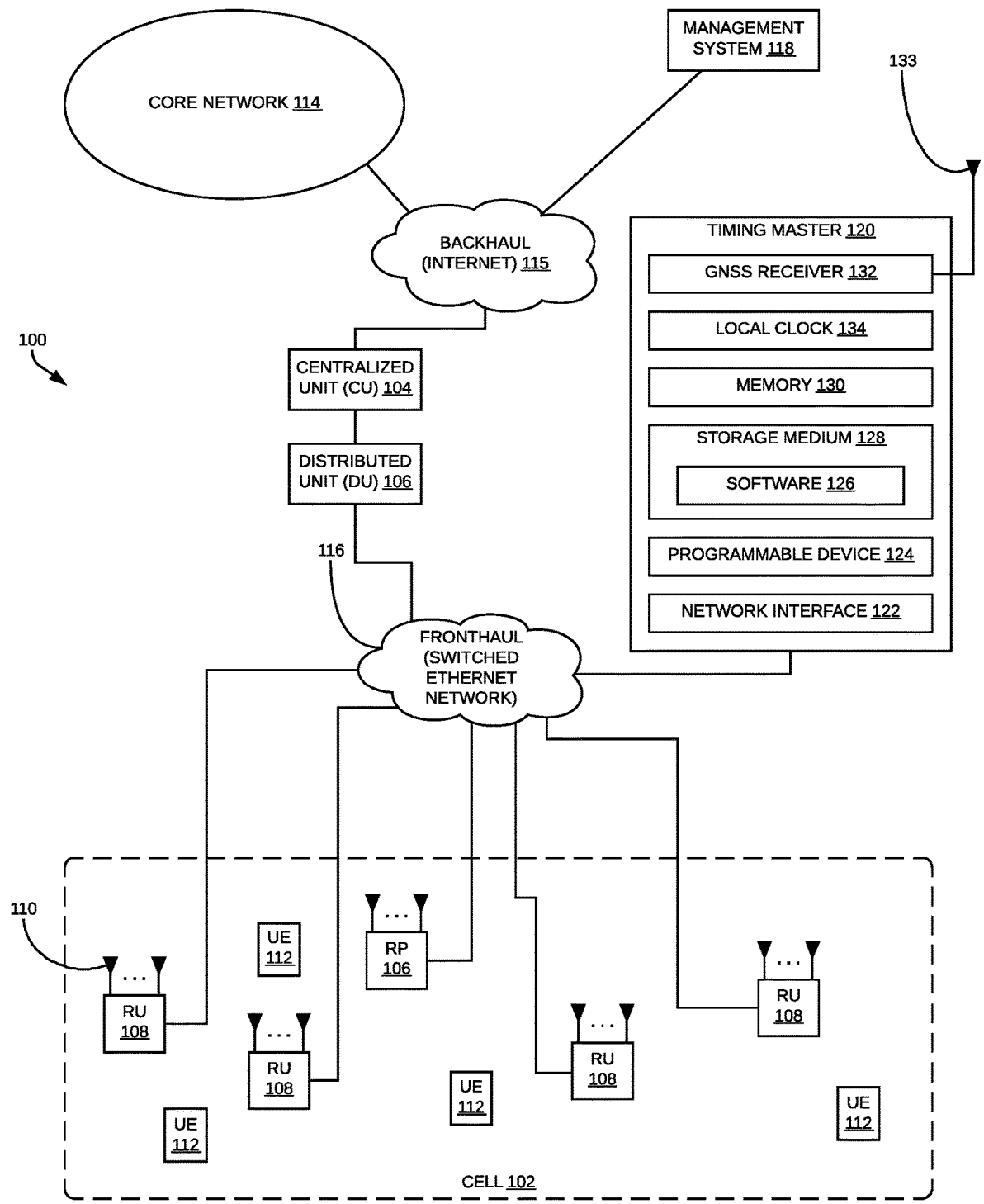

| | | | |
|---|---|---|---|
| 2019/0342023 A1 | 11/2019 | Struhsaker et al. | |
| 2019/0342800 A1* | 11/2019 | Sirotkin | H04W 80/02 |
| 2020/0374751 A1* | 11/2020 | Krishnaswamy | H04L 1/08 |

OTHER PUBLICATIONS

Freire et al. "Analysis of Controlled Packet Departure to Support Ethernet Fronthaul Synchronization via PTP", 2018 EEE International Symposium on Precision Clock Synchronization for Measurement, Control, and Communication (ISPCS), Sep. / Oct. 2018, pp. 1 through 7, IEEE.

International Searching Authority, "International Search Report and Written Opinion from PCT Application No. PCT/US2020/062323", from Foreign Counterpart to U.S. Appl. No. 17/104,985, filed Mar. 5, 2021, pp. 1 through 9, Published: WO.

Larsen et al., "A Survey of the Functional Splits Proposed for 5G Mobile Crosshaul Networks", IEEE Communications Surveys & Tutorials, Oct. 2018, pp. 1 through 29, IEEE.

* cited by examiner

AVOIDING CONTENTION BETWEEN SYNCHRONIZATION PACKETS AND IN-PHASE AND QUADRATURE (IQ) PACKETS COMMUNICATED OVER FRONTHAUL OF A RADIO ACCESS NETWORK

CROSS-REFERENCE TO RELATED APPLICATIONS

This application claims the benefit of U.S. Provisional Patent Application Ser. No. 62/940,767, filed on Nov. 26, 2019, which is hereby incorporated herein by reference in its entirety.

BACKGROUND

The 3GPP fifth generation (5G) radio access network (RAN) architecture includes a set of base stations (also referred to as "gNBs") connected to the 5G core network (5GC) and to each other. Each gNB comprises three entities—a centralized unit (CU), a distributed unit (DU), and a set of one or more radio units (RUs). The CU can be further split into a CU user plane entity (CU-UP) and a CU control plane entity (CU-CP). The functions of the RAN can be split among these entities in various ways. For example, the functional split between the DU and the RUs can be configured so that the DU implements some of the Layer-1 processing functions (for the wireless interface) and each RU implements the Layer-1 functions that are not implemented in the DU as well as the basic RF and antenna functions. The DU is coupled to each RU using a fronthaul network (for example, one implemented using a switched Ethernet network) over which data is communicated between the DU and each RU including, for example, user-plane data (for example, in-phase and quadrature (IQ) data representing time-domain or frequency-domain symbols).

Each RU is synchronized with its associated DU. That is, the local clock in each RU is synchronized with the local clock in the associated DU. One way this can be done is by synchronizing the DU and each RU to the same timing master. This synchronization can be done using the Institute of Electrical and Electronics Engineers (IEEE) 1588 Precision Time Protocol (PTP), where the timing master serves as a PTP grandmaster. When PTP is used, two types of PTP messages or packets are communicated over the fronthaul network. Synchronization (Synch) packets are communicated from the timing master to each DU or RU and Delay Request (DelReq) packets are communicated from each DU or RU to the timing master.

For best synchronization performance, a number of the Synch packets communicated each second to each DU or RU should not suffer contention delay with other traffic on the fronthaul network. Such contending traffic includes IQ data transmitted from the DU to the RUs. The DU typically transmits a burst of IQ packets for each 5G slot on the fronthaul, each burst transmission starting at approximately the same time relative to the start of the respective 5G slot. Without loss of generality in what follows we assume each IQ burst starts at the beginning of its corresponding slot.

The slot rate used in 5G can be specified by the following:

$$R\text{slot}=1000*2^v$$

where Rslot is the slot rate (in slots per second), v is the 5G numerology (for example, where a numerology of 3 (v=3) for 120 kHz subcarrier spacing). The slot rate has an associate slot period specifying a duration of each slot. A PTP grandmaster typically transmits Synch packets at a rate of predetermined number of packets every second (represented here by the variable Ns). Therefore, there is 1/Ns seconds between consecutive Synch packets transmitted by the PTP grandmaster. As a result, the number of slots (represented here by the variable M) between consecutive Synch packets is M=(1000*$2^v$)/Ns. In general, the number of slots between consecutive Synch packets M is not an integer.

Specifications promulgated by the Open Radio Access Network (O-RAN) Alliance recommend the use of a Synch packet transmission rate Ns that is a power of 2. That is, the recommended Synch packet transmission rate can be represented as:

$$Ns=2^k$$

where k∈{0, 1, 2, . . . , 7}. As a result, the number of slots between consecutive Synch packets M can be represented as:

$$M=1000*2^{(v-k)}$$

The nth Synch packet is transmitted into the fronthaul network during the current slot at the following time (in general a fractional (non-integer) number of slots):

$$Arr\_n=\text{theta}+n*M$$

where theta is an arbitrary "phase" difference between timing master and the DU and is 0≤theta<M. Note that M will be an integer when k≤v+3. Taking a numerology of 3 (that is, v=3), for each recommended rate in {1,2,4,8,16,32, 64}, M is an integer and all Synch packets are transmitted into the fronthaul at the same time, modulo the slot duration of 125 microseconds (us). For a Synch packet transmission rate Ns of 128 packets per second, the number of slots between consecutive Synch packets M would equal 1000/16 or 62.5 slots and Synch packets would be transmitted at only two distinct times within any given slot (that is, either at the beginning of the slot or at the midpoint of the slot, offset by theta). If the transmission time (duration) for the burst of IQ packets for each slot is T>0.5 slots and 0<=(theta modulo 1)<=T−0.5, it is seen that all of the 128 synchronization packets will experience contention with IQ packets. This will impair the performance of the PTP synchronization process. This will occur because, as stated earlier, the DU will transmit a new batch of IQ packets on the fronthaul for each 5G slot, with those IQ packets being transmitted at approximately the same point in each 5G slot. Note in the above discussion that if each IQ burst were to instead start with a nonzero delay relative to the start of the slot, and if there were different propagation delays for Synch packets than for the IQ burst to a given switch, the above condition 0<=(theta modulo 1)<=T−0.5 for contention at the switch would still apply, but with a shifted interval, i.e., 0+tau modulo 1<=(theta modulo 1)<=T−0.5+tau modulo 1, for tau depending on IQ burst start time, and the propagation delays.

SUMMARY

One embodiment is directed to a timing master for use in a radio access network (RAN) comprising a plurality of nodes, at least some of which are communicatively coupled to each other via a fronthaul network. The RAN is configured to wirelessly communicate with user equipment (UE) using a predetermined slot rate having an associated slot period specifying a slot duration of each slot. The timing master comprises one or more network interfaces to communicatively couple the timing master to the fronthaul network, at least one programmable device coupled to the one or more network interfaces, a global navigation satellite system (GNSS) receiver coupled to the at least one programmable processor; and a local clock coupled to the at least one programmable device. The timing master is configured to communicate synchronization packets from the timing master to at least some of the nodes of the RAN over the fronthaul network at a synchronization packet transmission rate, the synchronization packet transmission rate specifying a number of synchronization packets transmitted each second. Each of said number of synchronization packets transmitted each second is transmitted at a respective transmission time offset relative to the slot period. The timing master is configured so that the respective transmission time offsets modulo the slot duration for said number of synchronization packets transmitted during each second are unique and distributed throughout the slot period.

Another embodiment is directed to a system comprising a radio access network (RAN) comprising a plurality of nodes, at least some of which are communicatively coupled to each other via a fronthaul network. The system also comprises a timing master communicatively coupled to the nodes of the RAN via the fronthaul network. The RAN is configured to wirelessly communicate with user equipment (UE) using a predetermined slot rate having an associated slot period specifying a slot duration of each slot. The system is configured to communicate synchronization packets from the timing master to at least some of the nodes of the RAN over the fronthaul network at a synchronization packet transmission rate, the synchronization packet transmission rate specifying a number of synchronization packets transmitted each second. Each of said number of synchronization packets transmitted each second is transmitted at a respective transmission time offset relative to the slot period. The system is configured so that the respective transmission time offsets modulo the slot duration for said number of synchronization packets transmitted during each second are unique and distributed throughout the slot period.

Another embodiment is directed to a method of operating a radio access network (RAN) comprising a plurality of nodes, at least some of which are communicatively coupled to each other via a fronthaul network, the method comprises wirelessly communicating with user equipment (UE) using a predetermined slot rate having an associated slot period specifying a slot duration of each slot and communicating synchronization packets from the timing master to at least some of the nodes of the RAN over the fronthaul network at a synchronization packet transmission rate, the synchronization packet transmission rate specifying a number of synchronization packets transmitted each second. Each of said number of synchronization packets transmitted each second is transmitted at a respective transmission time offset relative to the slot period. The respective transmission time offsets modulo the slot duration for said number of synchronization packets transmitted during each second are unique and distributed throughout the slot period.

Another embodiment is directed to a radio access network (RAN) system comprising a plurality of nodes, at least some of which are communicatively coupled to each other via a fronthaul network. The RAN system is configured to wirelessly communicate with user equipment (UE). The system is configured so that, while at least one of the nodes of the RAN system receives synchronization packets transmitted from a timing master over the fronthaul network at a synchronization packet transmission rate and synchronization packet phase, said at least one of the nodes discovers the synchronization packet transmission phase of the synchronization packets being transmitted from the timing master and selectively delays transmission of at least some in-phase and quadrature (IQ) data over the fronthaul network in order to avoid contention with at least some of the synchronization packets transmitted from the timing master over the fronthaul network.

Another embodiment is directed to a method of operating a radio access network (RAN) comprising a plurality of nodes, at least some of which are communicatively coupled to each other via a fronthaul network. The RAN is configured to wirelessly communicate with user equipment (UE). The method comprises, while at least one of the nodes of the RAN system receives synchronization packets transmitted from a timing master over the fronthaul network at a synchronization packet transmission rate and a synchronization packet transmission phase, discovering, by said at least one of the nodes, the synchronization packet transmission phase of the synchronization packets being transmitted from the timing master and selectively delaying, by said at least one of the nodes, transmission of at least some in-phase and quadrature (IQ) data over the fronthaul network in order to avoid contention with at least some of the synchronization packets transmitted from the timing master over the fronthaul network.

Other embodiments are disclosed.

The details of various embodiments are set forth in the accompanying drawings and the description below. Other features and advantages will become apparent from the description, the drawings, and the claims.

DRAWINGS

FIG. 1 is a block diagram illustrating one exemplary embodiment of a centralized radio access network (C-RAN).

Figure 2:
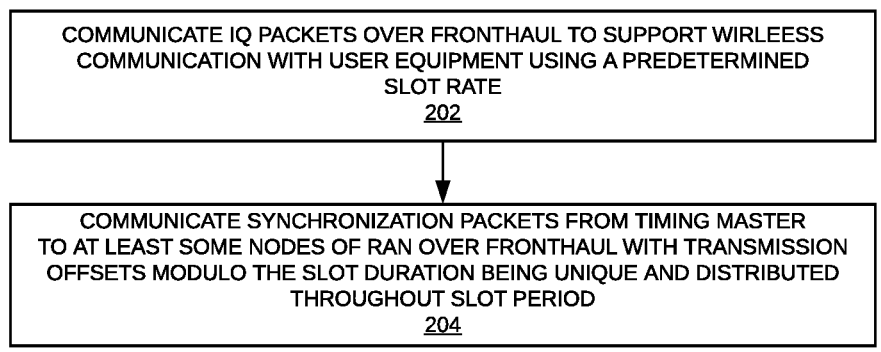

FIG. 2 comprises a high-level flowchart illustrating one exemplary embodiment of a method of operating a radio access network (RAN) in which contention between IQ packets and at least some synchronization packets communicated over the fronthaul is avoided.

Figure 3:
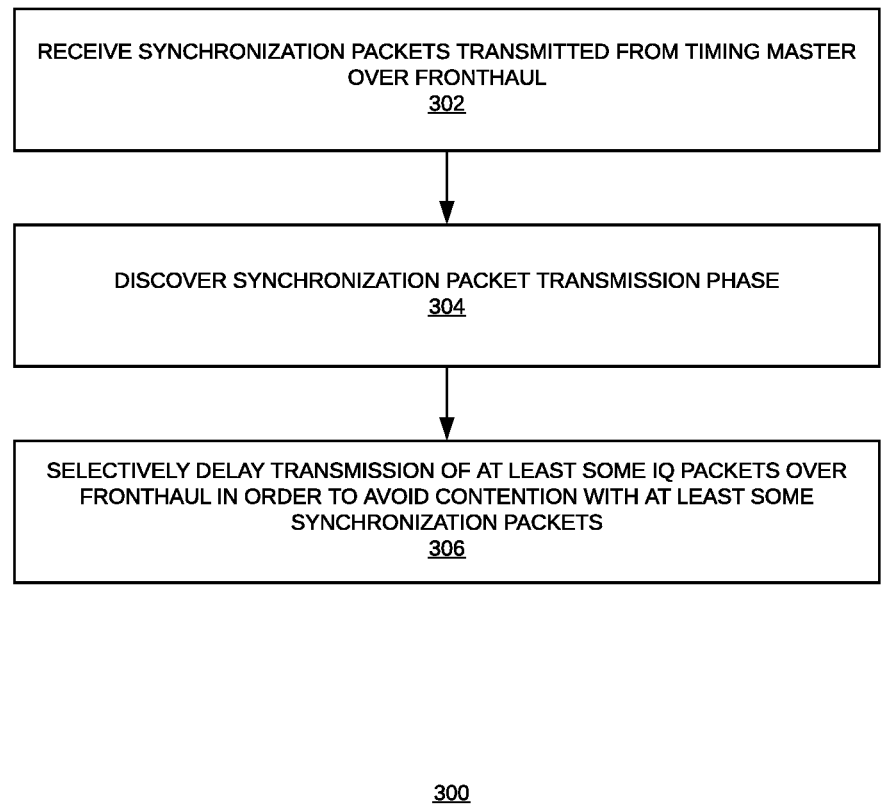

FIG. 3 comprises a high-level flowchart illustrating one exemplary embodiment of a method of operating a RAN in which contention between IQ packets and at least some synchronization packets communicated over the fronthaul is avoided.

Like reference numbers and designations in the various drawings indicate like elements.

DETAILED DESCRIPTION

FIG. 1 is a block diagram illustrating one exemplary embodiment of a centralized radio access network (C-RAN) 100. The C-RAN 100 is also referred to here as a "C-RAN system" 100, "RAN system" 100, "RAN" 100, or just "system" 100). The C-RAN 100 shown in FIG. 1 implements a base station. The C-RAN system 100 can also be referred to here as a "base station" or "base station system."

The example shown in FIG. 1 is described here as being configured to implement a 5G RAN architecture in which the base station 100 comprises, for each cell 102 served by the base station 100, a central unit (CU) 104, a distributed unit (DU) 106, and multiple remote units (RUs) 108. Each remote unit 108 is remotely located from the CU 104 and, in the example shown in FIG. 1, the DU 106. Also, in this exemplary embodiment, at least one of the RUs 108 is remotely located from at least one other RU 108. Each RU 108 includes or is coupled to one or more antennas 110 via which downlink RF signals are radiated to various items of user equipment (UE) 112 and via which uplink RF signals transmitted by UEs 112 are received.

The system 100 is coupled to a core network 114 of the associated wireless network operator over an appropriate back-haul 115 (such as the Internet). Also, each DU 106 is communicatively coupled to the RUs 108 served by it using a front-haul network 116. The DU 106 and the RUs 108 include one or more network interfaces (not shown) in order to enable the DU 106 and RUs 108 to communicate over the front-haul network 116.

In one implementation, the front-haul 116 that communicatively couples each DU 106 to the RUs 108 is implemented using a switched ETHERNET network. In such an implementation, each DU 108 and RU 108 includes one or more ETHERNET interfaces for communicating over the switched ETHERNET network used for the front-haul 116. However, it is to be understood that the front-haul between each DU 106 and the RUs 108 served by it can be implemented in other ways.

Generally, for each cell 102 implemented by the C-RAN 100, the corresponding CU 104 and DU 106 serving the cell 102 performs the LAYER-3 and LAYER-2 functions for the particular wireless interface used for that cell 102. Also, for each cell 102 implemented by the C-RAN 100, the corresponding DU 106 serving the cell 102 performs some of the LAYER-1 functions for the particular wireless interface used for that cell 102. Each of the RUs 108 serving that cell 102 perform the LAYER-1 functions not performed by the DU 106 as well as implementing the basic RF and antenna functions.

In the particular embodiment shown in FIG. 1, the C-RAN 100 is configured to use one or more Fifth Generation (5G) wireless interfaces, associated protocols, and architectures. However, it is to be understood that other embodiments can be implemented in other ways—for example, the C-RAN 100 can be configured to use other wireless interfaces, protocols, and architectures such as the Long-Term Evolution (LTE) wireless interfaces, protocols, architectures and/or to support multiple wireless interfaces, protocols, and architectures (for example, to support both 5G and LTE wireless interfaces, protocols, and architectures).

In the exemplary embodiment shown in FIG. 1, a management system 118 is communicatively coupled to the CU 104, DU 106, and the RUs 108, for example, via the Internet (or another network used to implement the back-haul 115 to the core network 114) and an Ethernet network (for example, an Ethernet network used to implement the front-haul network 118).

Each CU 104, DU 106, RU 108, and management system 118 (and the functionality described as being included therein), as well as the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). Also, the RF functionality can be implemented using one or more RF integrated circuits (RFICs) and/or discrete components. Each CU 104, DU 106, RU 108, and management system 118 and the system 100 more generally, can be implemented in other ways.

In the embodiment shown in FIG. 1, a timing master 120 is used to synchronize one or more nodes of the RAN 100. The timing master 120 can be implemented as a PTP grandmaster.

In this embodiment, the timing master 120 comprises one or more network interfaces 122 to communicatively couple the timing master 120 to the fronthaul 116. In this particular embodiment, where the fronthaul 120 is implemented using a switched Ethernet network, the one or more network interfaces 122 comprise one or more Ethernet network interfaces.

In the embodiment shown in FIG. 1, the timing master 120 further comprises at least one programmable processor or other programmable device 124 coupled to the one or more network interfaces 122. The programmable device 124 is configured to execute software 126. The software 126 can be implemented as program instructions or configuration logic that are stored (or otherwise embodied) on an appropriate non-transitory storage medium or media 128 from which at least a portion of the program instructions or configuration logic are read by one or more programmable devices 124 for execution thereby or configuration thereof. The software 126 is configured to cause the timing master 120 to carry out at least some of the functions described here as being performed by it. Although the storage medium 128 is shown in FIG. 1 as being included in the timing master 120, it is to be understood that remote storage media (for example, storage media that is accessible over a network) and/or removable media can also be used. The timing master 120 also comprises memory 130 for storing the program instructions or configuration logic and/or any related data while the functions implemented by the software 126 are performed.

In the embodiment shown in FIG. 1, the timing master 120 further comprises a global navigation satellite system (GNSS) receiver 132 coupled to at least one programmable device 124. An antenna 133 is coupled to the GNSS receiver 132. The GNSS receiver 132 is configured to receive and process signals broadcasted by satellites in order to determine the precise time and to synchronize the local clock 134 included in the timing master 120 to the precise time. The GNSS receiver 132 can be implemented so as to implement one of more of a Global Positioning System (GPS) GNSS receiver, a Global Navigation Satellite System (GLONASS) GNSS receiver, a Galileo GNSS receiver, and a BeiDou Navigation Satellite System (BDS) GNSS receiver. Other types of GNSS receivers 132 can be used.

Each RU 108 is synchronized with its associated DU 106. That is, the local clock in each RU 108 is synchronized with the local clock in the associated DU 106. In this embodiment, this is done by synchronizing the DU 106 and each RU 108 to the timing master 120 using the Institute of Electrical and Electronics Engineers (IEEE) 1588 Precision Time Protocol (PTP). For example, the software 126 executed by the timing master 120 can implement a PTP grandmaster that is configured to communicate PTP Synch packets from the timing master 120 to at least some of the nodes of the RAN 100 (for example, the DU 106 and RU 108) over the fronthaul network 116 at a Synch packet transmission rate (Ns), which is also referred to here as the "synchronization rate." The synchronization rate Ns specifies the number of PTP Synch packets transmitted each second.

As noted above, specifications promulgated by the O-RAN) Alliance recommend the use of a Synch packet transmission rate Ns that is a power of 2. This may result in every Synch packet contending with an IQ packet transmitted from the DU 106 over the fronthaul 116, which will impair the performance of the PTP synchronization process.

In order to avoid this issue with using the recommended synchronization packet transmission rates, one or more of the DU 106 and/or the timing master 120 can be configured to avoid contention between IQ packets and at least some of the PTP Synch packets that are communicated over the fronthaul 116.

FIG. 2 comprises a high-level flowchart illustrating one exemplary embodiment of a method 200 of operating a radio access network (RAN) in which contention between IQ packets and at least some synchronization packets communicated over the fronthaul 116 is avoided.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

The embodiment of method 200 shown in FIG. 2 is described here as being implemented in the RAN 100 of FIG. 1, though it is to be understood that other embodiments can be implemented in other ways.

Method 200 comprises, while communicating IQ packets over the fronthaul network 116 to support wireless communication with user equipment 112 using a predetermined slot rate Rslot (block 202), communicating synchronization packets from the timing master 120 to at least some of the nodes of the RAN 100 over the fronthaul network 116 with the respective transmission offsets modulo the slot duration of the synchronization packets transmitted during any given second being unique and distributed throughout the slot period (block 204).

In this example, the synchronization packets comprise PTP Synch packets that the timing master 120 communicates to the DU 106 and the RUs 108 over the switched Ethernet network used to implement the fronthaul network 116.

As noted above, the slot rate has an associate slot period specifying a duration of each slot (also referred to here as the "slot duration"). As used here, the "transmission offset" modulo the slot duration of a given synchronization packet transmitted by the timing master 120 is the difference between the time that synchronization packet is sent and the start of the slot during which that packet was sent.

As noted above, with a slot rate of 8000 slots per second (corresponding to a 5G numerology of 3) and a synchronization packet transmission rate of 128 packets per second, the number of slots between consecutive synchronization packets would be 62.5 slots (8000/128) and synchronization packets would be transmitted at only two transmission offsets—either a transmission offset corresponding to the beginning of the slot or a transmission offset corresponding to the midpoint of the slot. If the transmission time (duration) for the burst of IQ packets for each slot is T>0.5 slots and 0<=(theta modulo 1)<=T−0.5, it is seen that all of the 128 synchronization packets will experience contention with IQ packets. However, if the synchronization packets are transmitted in a manner that the transmission offsets (modulo the slot duration) of the synchronization packets transmitted during any given second are unique and distributed throughout the slot period, there should be a number of synchronization packets that are transmitted during the portion of a slot when it is not likely that synchronization packets will experience contention with IQ packets. This will enable the synchronization process to be successfully performed.

In one implementation of method 200, the timing master 120 is configured to transmit the synchronization packets in a way so that the amount of time between the successive synchronization packets is constant and determined by the synchronization packet transmission rate. The timing master 120 is configured to use a synchronization packet transmission rate that results in the synchronization packets being transmitted from the timing master 120 with the respective transmission offsets of the synchronization packets transmitted during any given second being unique and uniformly distributed throughout the slot period. For example, for the set of synchronization packet transmission rates Ns from 1 to 128 (that is, for Ns∈{1, 2, 3, . . . , 127, 128}), there are 51 synchronization packet transmission rates Ns that will result in the synchronization packets being transmitted from the timing master 120 with the respective transmission offsets of the synchronization packets transmitted during any given second being unique and uniformly distributed throughout the slot period. The 51 "best" synchronization packet transmission rates (in packets per second) are the following: 1, 3, 7, 9, 11, 13, 17, 19, 21, 23, 27, 29, 31, 33, 37, 39, 41, 43, 47, 49, 51, 53, 57, 59, 61, 63, 67, 69, 71, 73, 77, 79, 81, 83, 87, 89, 91, 93, 97, 99, 101, 103, 107, 109, 111, 113, 117, 119, 121, 123, and 127.

In a second implementation, the timing master 120 is configured to randomize the transmission offsets of the synchronization packets uniformly over the slot period. For example, the timing master 120 can be configured so that the absolute transmission start time for the nth synchronization packet is randomized uniformly on the interval n/Ns±1/(2 Rslot).

FIG. 3 comprises a high-level flowchart illustrating one exemplary embodiment of a method 200 of operating a radio access network (RAN) in which contention between IQ packets and at least some synchronization packets communicated over the fronthaul 116 is avoided.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

Method 300 comprises, while receiving, by a node of a RAN 100 (such as the DU 1060, synchronization packets transmitted from the timing master 120 over the fronthaul network 116 at a synchronization packet transmission rate and phase (block 302), discovering, by that node, the synchronization packet transmission phase of the synchronization packets being transmitted (block 304) and selectively delaying transmission of at least some in-phase and quadrature (IQ) data over the fronthaul network 116 in order to avoid contention with at least some of the synchronization packets transmitted from the timing master 120 over the fronthaul network 116 (block 306).

In one implementation, this is done by the DU 106. The DU 106 is configured to discover the synchronization packet transmission phase of the synchronization packets being transmitted over the fronthaul 116 by tracking the times at which at least some of the synchronization packets are received and then determining the synchronization packet transmission phases from these tracked times (the synchronization packet transmission phase is the transmission time for synchronization packet modulo the slot duration). Then, the DU 106 uses the slot rate, the synchronization packet transmission rate, and phase to determine the transmission time offset for each synchronization packet transmitted during a given second and uses these transmission time offsets to determine if at least some of the synchronization packets transmitted from the timing master 120 over the fronthaul network 116 will experience contention with IQ packets transmitted from the DU 106. If that is the case, the DU 106 delays the transmission of at least some IQ data over the fronthaul network 116 in order to create gaps in the IQ bursts and avoid contention with at least some of the synchronization packets transmitted from the timing master 120.

Performing the processing associated with method 300 ensures that at least some of the synchronization packets transmitted from the timing master 120 over the fronthaul network 116 will not experience contention with IQ packets transmitted from the DU 106, which enables the synchronization process to be successfully performed.

Other embodiments can be implemented in other ways.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a timing master for use in a radio access network (RAN) comprising a plurality of nodes, at least some of which are communicatively coupled to each other via a fronthaul network, wherein the RAN is configured to wirelessly communicate with user equipment (UE) using a predetermined slot rate having an associated slot period specifying a slot duration of each slot, the timing master comprising: one or more network interfaces to communicatively couple the timing master to the fronthaul network; at least one programmable device coupled to the one or more network interfaces; a global navigation satellite system (GNSS) receiver coupled to the at least one programmable processor; and a local clock coupled to the at least one programmable device; wherein the timing master is configured to communicate synchronization packets from the timing master to at least some of the nodes of the RAN over the fronthaul network at a synchronization packet transmission rate, the synchronization packet transmission rate specifying a number of synchronization packets transmitted each second, wherein each of said number of synchronization packets transmitted each second is transmitted at a respective transmission time offset relative to the slot period; and wherein the timing master is configured so that the respective transmission time offsets modulo the slot duration for said number of synchronization packets transmitted during each second are unique and distributed throughout the slot period.

Example 2 includes the timing master of Example 1, wherein the one or more network interfaces comprises one or more Ethernet network interfaces to communicatively couple the timing master to a switched Ethernet fronthaul network.

Example 3 includes the timing master of any of Examples 1-2, wherein the timing master is configured to implement an Institute of Electrical and Electronics Engineers (IEEE) 1588 Precision Time Protocol (PTP), wherein the synchronization packets comprise PTP synchronization packets.

Example 4 includes the timing master of Example 3, wherein the timing master comprises a PTP grandmaster.

Example 5 includes the timing master of any of Examples 1-4, wherein the GNSS receiver comprises at least one of a Global Positioning System (GPS) GNSS receiver, a Global Navigation Satellite System (GLONASS) GNSS receiver, a Galileo GNSS receiver, and a BeiDou Navigation Satellite System (BDS) GNSS receiver.

Example 6 includes the timing master of any of Examples 1-5, wherein the timing master is configured to transmit the synchronization packets so that the amount of time between the successive synchronization packets is constant and determined by the synchronization packet transmission rate, wherein the synchronization packet transmission rate that is used results in the synchronization packets being transmitted from the timing master with the respective transmission offsets modulo slot duration of the synchronization packets transmitted during any given second being unique and uniformly distributed throughout the slot period.

Example 7 includes the timing master of Example 6, wherein the synchronization packet transmission rate comprises one of: 1 packet per second, 3 packets per second, 7 packets per second, 9 packets per second, 11 packets per second, 13 packets per second, 17 packets per second, 19 packets per second, 21 packets per second, 23 packets per second, 27 packets per second, 29 packets per second, 31 packets per second, 33 packets per second, 37 packets per second, 39 packets per second, 41 packets per second, 43 packets per second, 47 packets per second, 49 packets per second, 51 packets per second, 53 packets per second, 57 packets per second, 59 packets per second, 61 packets per second, 63 packets per second, 67 packets per second, 69 packets per second, 71 packets per second, 73 packets per second, 77 packets per second, 79 packets per second, 81 packets per second, 83 packets per second, 87 packets per second, 89 packets per second, 91 packets per second, 93 packets per second, 97 packets per second, 99 packets per second, 101 packets per second, 103 packets per second, 107 packets per second, 109 packets per second, 111 packets per second, 113 packets per second, 117 packets per second, 119 packets per second, 121 packets per second, 123 packets per second, and 127 packets per second.

Example 8 includes the timing master of any of Examples 1-7, wherein the timing master is configured to randomize the transmission offsets of the synchronization packets uniformly over the slot period.

Example 9 includes the timing master of Example 8, wherein the timing master is configured to randomize the transmission time of the synchronization packets at the synchronization packet transmission rate Ns uniformly over the slot period by randomizing the transmission time of the nth synchronization packet for each second uniformly over a period that is n/Ns plus or minus one-half of the slot duration of the slot period.

Example 10 includes a system comprising: a radio access network (RAN) comprising a plurality of nodes, at least some of which are communicatively coupled to each other via a fronthaul network; and a timing master communicatively coupled to the nodes of the RAN via the fronthaul network; wherein the RAN is configured to wirelessly communicate with user equipment (UE) using a predetermined slot rate having an associated slot period specifying a slot duration of each slot; wherein the system is configured to communicate synchronization packets from the timing master to at least some of the nodes of the RAN over the fronthaul network at a synchronization packet transmission rate, the synchronization packet transmission rate specifying a number of synchronization packets transmitted each second, wherein each of said number of synchronization packets transmitted each second is transmitted at a respective transmission time offset relative to the slot period; and wherein the system is configured so that the respective transmission time offsets modulo the slot duration for said number of synchronization packets transmitted during each second are unique and distributed throughout the slot period.

Example 11 includes the system of Example 10, wherein the RAN comprises: a centralized unit (CU); a distributed unit (DU) communicatively coupled to the CU; and a plurality of remote units (RUs) communicatively coupled to the DU via the fronthaul network.

Example 12 includes the system of any of Examples 10-11, wherein the fronthaul network comprises a switched Ethernet fronthaul network.

Example 13 includes the system of any of Examples 10-12, wherein the synchronization packets comprise Institute of Electrical and Electronics Engineers (IEEE) 1588 Precision Time Protocol (PTP) synchronization packets.

Example 14 includes the system of Example 13, wherein the timing master comprises a PTP grandmaster.

Example 15 includes the system of any of Examples 10-14, wherein the system is configured to wirelessly communicate with the user equipment using a Fifth Generation (5G) wireless protocol.

Example 16 includes the system of any of Examples 10-15, wherein the timing master is configured to transmit the synchronization packets so that the amount of time between the successive synchronization packets is constant and determined by the synchronization packet transmission rate, wherein the synchronization packet transmission rate that is used results in the synchronization packets being transmitted from the timing master with the respective transmission offsets modulo the slot duration of the synchronization packets transmitted during any given second being unique and uniformly distributed throughout the slot period.

Example 17 includes the system of Example 16, wherein the synchronization packet transmission rate comprises one of: 1 packet per second, 3 packets per second, 7 packets per second, 9 packets per second, 11 packets per second, 13 packets per second, 17 packets per second, 19 packets per second, 21 packets per second, 23 packets per second, 27 packets per second, 29 packets per second, 31 packets per second, 33 packets per second, 37 packets per second, 39 packets per second, 41 packets per second, 43 packets per second, 47 packets per second, 49 packets per second, 51 packets per second, 53 packets per second, 57 packets per second, 59 packets per second, 61 packets per second, 63 packets per second, 67 packets per second, 69 packets per second, 71 packets per second, 73 packets per second, 77 packets per second, 79 packets per second, 81 packets per second, 83 packets per second, 87 packets per second, 89 packets per second, 91 packets per second, 93 packets per second, 97 packets per second, 99 packets per second, 101 packets per second, 103 packets per second, 107 packets per second, 109 packets per second, 111 packets per second, 113 packets per second, 117 packets per second, 119 packets per second, 121 packets per second, 123 packets per second, and 127 packets per second.

Example 18 includes the system of any of Examples 10-17, wherein the timing master is configured to randomize the transmission offsets of the synchronization packets uniformly over the slot period.

Example 19 includes the system of Example 18, wherein the timing master is configured to randomize the transmission time of the synchronization packets at the synchronization packet transmission rate Ns uniformly over the slot period by randomizing the transmission time of the nth synchronization packet for each second uniformly over a period that is n/Ns plus or minus one-half of the slot duration of the slot period.

Example 20 includes a method of operating a radio access network (RAN) comprising a plurality of nodes, at least some of which are communicatively coupled to each other via a fronthaul network, the method comprising: wirelessly communicating with user equipment (UE) using a predetermined slot rate having an associated slot period specifying a slot duration of each slot; and communicating synchronization packets from the timing master to at least some of the nodes of the RAN over the fronthaul network at a synchronization packet transmission rate, the synchronization packet transmission rate specifying a number of synchronization packets transmitted each second, wherein each of said number of synchronization packets transmitted each second is transmitted at a respective transmission time offset relative to the slot period; and wherein the respective transmission time offsets modulo the slot duration for said number of synchronization packets transmitted during each second are unique and distributed throughout the slot period.

Example 21 includes the method of Example 20, wherein communicating the synchronization packets from the timing master to at least some of the nodes of the RAN over the fronthaul network at the synchronization packet transmission rate comprises using a synchronization packet transmission rate that results in the synchronization packets being transmitted from the timing master so that the amount of time between the successive synchronization packets is constant and determined by the synchronization packet transmission rate, wherein the synchronization packet transmission rate that is used results in the synchronization packets being transmitted from the timing master with the respective transmission offsets of the synchronization packets transmitted during any given second being unique and uniformly distributed throughout the slot period.

Example 22 includes the method of Example 21, wherein the synchronization packet transmission rate comprises one of: 1 packet per second, 3 packets per second, 7 packets per second, 9 packets per second, 11 packets per second, 13 packets per second, 17 packets per second, 19 packets per second, 21 packets per second, 23 packets per second, 27 packets per second, 29 packets per second, 31 packets per second, 33 packets per second, 37 packets per second, 39 packets per second, 41 packets per second, 43 packets per second, 47 packets per second, 49 packets per second, 51 packets per second, 53 packets per second, 57 packets per second, 59 packets per second, 61 packets per second, 63 packets per second, 67 packets per second, 69 packets per second, 71 packets per second, 73 packets per second, 77 packets per second, 79 packets per second, 81 packets per second, 83 packets per second, 87 packets per second, 89 packets per second, 91 packets per second, 93 packets per second, 97 packets per second, 99 packets per second, 101 packets per second, 103 packets per second, 107 packets per second, 109 packets per second, 111 packets per second, 113 packets per second, 117 packets per second, 119 packets per second, 121 packets per second, 123 packets per second, and 127 packets per second.

Example 23 includes the method of any of Examples 20-22, wherein communicating the synchronization packets from the timing master to at least some of the nodes of the RAN over the fronthaul network at the synchronization packet transmission rate comprises randomizing the transmission offsets of the synchronization packets uniformly over the slot period.

Example 24 includes the method of any of Examples 20-23, wherein the timing master is configured to randomize the transmission time of the synchronization packets at the synchronization packet transmission rate Ns uniformly over the slot period by randomizing the transmission time of the nth synchronization packet for each second uniformly over a period that is n/Ns plus or minus one-half of the slot duration of the slot period.

Example 25 includes a radio access network (RAN) system comprising: a plurality of nodes, at least some of which are communicatively coupled to each other via a fronthaul network; wherein the RAN system is configured to wirelessly communicate with user equipment (UE); and wherein the system is configured so that, while at least one of the nodes of the RAN system receives synchronization packets transmitted from a timing master over the fronthaul network at a synchronization packet transmission rate and synchronization packet phase, said at least one of the nodes discovers the synchronization packet transmission phase of the synchronization packets being transmitted from the timing master and selectively delays transmission of at least some in-phase and quadrature (IQ) data over the fronthaul network in order to avoid contention with at least some of the synchronization packets transmitted from the timing master over the fronthaul network.

Example 26 includes the RAN system of Example 25, wherein the plurality of nodes comprises: a distributed unit (DU); and a plurality of remote units (RUs) communicatively coupled to the DU via the fronthaul network.

Example 27 includes the RAN system of Example 26, wherein said at least one of the nodes comprises the DU.

Example 28 includes the RAN system of any of Examples 26-27, wherein the plurality of nodes further comprises a centralized unit (CU) that is communicatively coupled to the DU.

Example 29 includes the RAN system of any of Examples 25-28, wherein said at least one of the nodes discovers the synchronization packet transmission phase of the synchronization packets being transmitted from the timing master by: tracking the times at which at least some of the synchronization packets are received; and determining the synchronization packet transmission phase from the tracked times.

Example 30 includes the RAN system of Example 29, wherein said at least one of the nodes selectively delays transmission of at least some IQ data over the fronthaul network in order to avoid contention with at least some of the synchronization packets transmitted from the timing master over the fronthaul network by: using the slot rate, the synchronization packet transmission rate, and the discovered synchronization packet transmission phase to determine the transmission time offset for each synchronization packet transmitted during a given second; using the transmission time offsets to determine if at least some of the synchronization packets transmitted from the timing master over the fronthaul network will experience contention with IQ packets transmitted from said at least one of the nodes over the fronthaul network; and in response to determining that at least some of the synchronization packets transmitted from the timing master over the fronthaul network will experience contention with IQ packets transmitted from said at least one of the nodes over the fronthaul network, delaying transmission of at least some IQ data over the fronthaul network in order to avoid contention with at least some of the synchronization packets transmitted from the timing master.

Example 31 includes the RAN system of any of Examples 25-30, wherein the fronthaul network comprises a switched Ethernet fronthaul network.

Example 32 includes the RAN system of any of Examples 25-31, wherein the synchronization packets comprise Institute of Electrical and Electronics Engineers (IEEE) 1588 Precision Time Protocol (PTP) synchronization packets.

Example 33 includes the RAN system of Example 32, wherein the timing master comprises a PTP grandmaster.

Example 34 includes the RAN system of any of Examples 25-33, wherein the RAN system is configured to wirelessly communicate with the user equipment using a Fifth Generation (5G) wireless protocol.

Example 35 includes a method of operating a radio access network (RAN) comprising a plurality of nodes, at least some of which are communicatively coupled to each other via a fronthaul network, wherein the RAN is configured to wirelessly communicate with user equipment (UE), the method comprises: while at least one of the nodes of the RAN system receives synchronization packets transmitted from a timing master over the fronthaul network at a synchronization packet transmission rate and a synchronization packet transmission phase, discovering, by said at least one of the nodes, the synchronization packet transmission phase of the synchronization packets being transmitted from the timing master; and selectively delaying, by said at least one of the nodes, transmission of at least some in-phase and quadrature (IQ) data over the fronthaul network in order to avoid contention with at least some of the synchronization packets transmitted from the timing master over the fronthaul network.

Example 36 includes the method of Examples 35, wherein discovering, by said at least one of the nodes, the synchronization packet transmission phase of the synchronization packets being transmitted from the timing master comprises: tracking the times at which at least some of the synchronization packets are received; and determining the synchronization packet transmission phase from the tracked times.

Example 37 includes the method of Example 36, wherein selectively delaying, by said at least one of the nodes, transmission of at least some IQ data over the fronthaul network in order to avoid contention with at least some of the synchronization packets transmitted from the timing master over the fronthaul network comprises: using the slot rate, the synchronization packet transmission rate, and the discovered synchronization packet transmission phase to determine the transmission time offset for each synchronization packet transmitted during a given second; using the transmission time offsets to determine if at least some of the synchronization packets transmitted from the timing master over the fronthaul network will experience contention with IQ packets transmitted from said at least one of the nodes over the fronthaul network; and in response to determining that at least some of the synchronization packets transmitted from the timing master over the fronthaul network will experience contention with IQ packets transmitted from said at least one of the nodes over the fronthaul network, delaying transmission of at least some IQ data over the fronthaul network in order to avoid contention with at least some of the synchronization packets transmitted from the timing master.

Example 38 includes the method of any of Examples 35-37, wherein the fronthaul network comprises a switched Ethernet fronthaul network.

Example 39 includes the method of any of Examples 35-38, wherein the synchronization packets comprise Institute of Electrical and Electronics Engineers (IEEE) 1588 Precision Time Protocol (PTP) synchronization packets.

Example 40 includes the method of Example 39, wherein the timing master comprises a PTP grandmaster.

Example 41 includes the method of any of Examples 35-40, wherein the RAN is configured to wirelessly communicate with the user equipment using a Fifth Generation (5G) wireless protocol.

What is claimed is:

1. A radio access network (RAN) system comprising:
    a plurality of nodes, at least some of which are communicatively coupled to each other via a fronthaul network;
    wherein the RAN system is configured to wirelessly communicate with user equipment (UE); and
    wherein the system is configured so that, while at least one of the nodes of the RAN system receives synchronization packets transmitted from a timing master over the fronthaul network at a synchronization packet transmission rate and synchronization packet phase, said at least one of the nodes discovers the synchronization packet transmission phase of the synchronization packets being transmitted from the timing master and selectively delays, using the discovered synchronization packet transmission phase, transmission of at least some in-phase and quadrature (IQ) data over the fronthaul network in order to avoid contention with at least some of the synchronization packets transmitted from the timing master over the fronthaul network.

2. The RAN system of claim 1, wherein the plurality of nodes comprises:
    a distributed unit (DU); and
    a plurality of remote units (RUs) communicatively coupled to the DU via the fronthaul network.

3. The RAN system of claim 2, wherein said at least one of the nodes comprises the DU.

4. The RAN system of claim 2, wherein the plurality of nodes further comprises a centralized unit (CU) that is communicatively coupled to the DU.

5. The RAN system of claim 1, wherein said at least one of the nodes discovers the synchronization packet transmission phase of the synchronization packets being transmitted from the timing master by:
    tracking the times at which at least some of the synchronization packets are received; and
    determining the synchronization packet transmission phase from the tracked times.

6. The RAN system of claim 5, wherein said at least one of the nodes selectively delays, using the discovered synchronization packet transmission phase, transmission of at least some IQ data over the fronthaul network in order to avoid contention with at least some of the synchronization packets transmitted from the timing master over the fronthaul network by:
    using the slot rate, the synchronization packet transmission rate, and the discovered synchronization packet transmission phase to determine the transmission time offset for each synchronization packet transmitted during a given second;
    using the transmission time offsets to determine if at least some of the synchronization packets transmitted from the timing master over the fronthaul network will experience contention with IQ packets transmitted from said at least one of the nodes over the fronthaul network; and
    in response to determining that at least some of the synchronization packets transmitted from the timing master over the fronthaul network will experience contention with IQ packets transmitted from said at least one of the nodes over the fronthaul network, delaying transmission of at least some IQ data over the fronthaul network in order to avoid contention with at least some of the synchronization packets transmitted from the timing master.

7. The RAN system of claim 1, wherein the fronthaul network comprises a switched Ethernet fronthaul network.

8. The RAN system of claim 1, wherein the synchronization packets comprise Institute of Electrical and Electronics Engineers (IEEE) 1588 Precision Time Protocol (PTP) synchronization packets.

9. The RAN system of claim 8, wherein the timing master comprises a PTP grandmaster.

10. The RAN system of claim 1, wherein the RAN system is configured to wirelessly communicate with the user equipment using a Fifth Generation (5G) wireless protocol.

11. A method of operating a radio access network (RAN) comprising a plurality of nodes, at least some of which are communicatively coupled to each other via a fronthaul network, wherein the RAN is configured to wirelessly communicate with user equipment (UE), the method comprises:
    while at least one of the nodes of the RAN system receives synchronization packets transmitted from a timing master over the fronthaul network at a synchronization packet transmission rate and a synchronization packet transmission phase,
    discovering, by said at least one of the nodes, the synchronization packet transmission phase of the synchronization packets being transmitted from the timing master; and
    selectively delaying, by said at least one of the nodes using the discovered synchronization packet transmission phase, transmission of at least some in-phase and quadrature (IQ) data over the fronthaul network in order to avoid contention with at least some of the synchronization packets transmitted from the timing master over the fronthaul network.

12. The method of claim 11, wherein discovering, by said at least one of the nodes, the synchronization packet transmission phase of the synchronization packets being transmitted from the timing master comprises:
    tracking the times at which at least some of the synchronization packets are received; and
    determining the synchronization packet transmission phase from the tracked times.

13. The method of claim 12, wherein selectively delaying, by said at least one of the nodes using the discovered synchronization packet transmission phase, transmission of at least some IQ data over the fronthaul network in order to avoid contention with at least some of the synchronization packets transmitted from the timing master over the fronthaul network comprises:
- using the slot rate, the synchronization packet transmission rate, and the discovered synchronization packet transmission phase to determine the transmission time offset for each synchronization packet transmitted during a given second;
- using the transmission time offsets to determine if at least some of the synchronization packets transmitted from the timing master over the fronthaul network will experience contention with IQ packets transmitted from said at least one of the nodes over the fronthaul network; and
- in response to determining that at least some of the synchronization packets transmitted from the timing master over the fronthaul network will experience contention with IQ packets transmitted from said at least one of the nodes over the fronthaul network, delaying transmission of at least some IQ data over the fronthaul network in order to avoid contention with at least some of the synchronization packets transmitted from the timing master.

14. The method of claim 11, wherein the fronthaul network comprises a switched Ethernet fronthaul network.

15. The method of claim 11, wherein the synchronization packets comprise Institute of Electrical and Electronics Engineers (IEEE) 1588 Precision Time Protocol (PTP) synchronization packets.

16. The method of claim 15, wherein the timing master comprises a PTP grandmaster.

17. The method of claim 11, wherein the RAN is configured to wirelessly communicate with the user equipment using a Fifth Generation (5G) wireless protocol.

\* \* \* \* \*